United States Patent [19]
Coker et al.

[11] Patent Number: 5,784,010
[45] Date of Patent: Jul. 21, 1998

[54] METHOD AND APPARATUS FOR IMPLEMENTING A SET RATE CODE FOR DATA CHANNELS WITH ALTERNATE 9-BIT CODE WORDS AND 8-BIT CODE WORDS

[75] Inventors: Jonathan Darrel Coker; David Timothy Flynn; Richard Leo Galbraith, all of Rochester; Todd Carter Truax, Zumbrota, all of Minn.

[73] Assignee: International Business Machines Corporation, Armonk, N.Y.

[21] Appl. No.: 794,718

[22] Filed: Feb. 3, 1997

[51] Int. Cl.$^6$ .................................................. H03M 7/00
[52] U.S. Cl. .................................................. 341/61; 341/59
[58] Field of Search .............................. 341/50, 59, 52, 341/60, 63, 67, 102

[56] References Cited

U.S. PATENT DOCUMENTS

| | | | |
|---|---|---|---|
| 5,196,849 | 3/1993 | Galbraith | 341/59 |
| 5,260,703 | 11/1993 | Nguyen et al. | 341/100 |
| 5,438,460 | 8/1995 | Coker et al. | 360/46 |
| 5,438,590 | 8/1995 | Tzukerman et al. | 375/259 |
| 5,521,945 | 5/1996 | Knudson | 375/341 |
| 5,535,187 | 7/1996 | Melas et al. | 369/59 |
| 5,537,112 | 7/1996 | Tsang | 341/59 |
| 5,576,707 | 11/1996 | Zook | 341/58 |
| 5,604,497 | 2/1997 | Sonntag | 341/59 |
| 5,619,539 | 4/1997 | Coker et al. | 375/341 |
| 5,635,933 | 6/1997 | Fitzpatrick et al. | 341/58 |
| 5,675,569 | 10/1997 | Yamaguchi et al. | 369/124 |

FOREIGN PATENT DOCUMENTS

WO9708836  3/1997  WIPO ............... H03M 7/00

*Primary Examiner*—Richard T. Elms
*Assistant Examiner*—Kim-Ngoc Huynh
*Attorney, Agent, or Firm*—Joan Pennington

[57] ABSTRACT

A data encoding method and apparatus are provided for implementing a predefined rate code, such as a 16/17 rate code for a data detection channel in a direct access storage device. A binary data stream is received and sequential symbols of the received binary data stream are identified. Sequential alternate symbols of the binary data stream are encoded into first codewords. Sequential alternate other symbols are encoded into second codewords. The alternating first and second codewords are sequentially combined. For a rate 16/17 rate code, the first codewords include 9-bit codewords and the second codewords include 8-bit codewords. The second 8-bit codewords are either raw symbols of the received binary data stream or remapped symbols of the received binary data stream. All likely error events are limited to within three consecutive bytes in a user data stream with a 16/17 rate code of the preferred embodiment.

10 Claims, 6 Drawing Sheets

METHOD AND APPARATUS FOR IMPLEMENTING A SET RATE CODE FOR DATA CHANNELS WITH ALTERNATE 9-BIT CODE WORDS AND 8-BIT CODE WORDS

FIELD OF THE INVENTION

The present invention relates to methods and apparatus for encoding data, and more particularly to, data encoding method and apparatus for implementing a set rate code for a data detection channel, such as a 16/17 rate code for a partial-response maximum-likelihood (PRML) detection channel in a direct access storage device.

DESCRIPTION OF THE PRIOR ART

Disk drive units often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. A partial-response maximum-likelihood (PRML) detection channel advantageously is used to achieve high data density in writing and reading digital data on the disks.

Uncoded binary data is not suitable for PRML data channels because unconstrained customer data may contain long spans of null signal or adjacent zeroes which provides no timing or gain information to the channel and prevent proper timing and gain tracking to the readback signal waveform. Rate 8/9 modulation codes are known for use with PRML detection channels to assure a minimum correction rate for PRML timing and gain control loops.

U.S. Pat. No. 5,196,849 issued Mar. 23, 1993 to Richard L. Galbraith and assigned to the present assignee, discloses apparatus and a method for encoding a predefined number of bits of binary data into codewords having a predefined number of bits for PRML data channels. Rate 8/9 block codes having maximum ones and run length constraints (0,8,12, ∞) and (0,8,6, ∞) are disclosed for providing timing and gain control and reduced susceptibility to misequalization effects in PRML detection channels.

Rate 16/17 modulation codes also are known for use with data detection channels. Known 16/17 rate code implementations suffer from multiple problems as follows. Traditional 16/17 rate block encoded implementations can propagate likely error events to four consecutive bytes in error in the customer data stream. Four consecutive bytes in error is not correctable by single burst correction with conventional error correction code (ECC). Double burst correction would be required in this case to correct a simple error event. A traditional 16/17 rate block code would necessitate a major redesign of data channel logic that utilizes an 8/9 rate implementation. Also a traditional 16/17 rate block code would necessitate a significant increase in write path and read path propagation delays since 16 customer bits must be framed before encode can occur and since 17 encoded bits must be framed before decode can occur.

As compared to 8/9 rate coding, the use of 16/17 rate coding allows customer data to be stored on the disk more efficiently. Only 17 bits need to be stored on the disk for every 16 bits of customer data. The ideal 5.88% efficiency improvement of 16/17 rate coding over 8/9 rate coding is reduced slightly by the fact that the sync field(s) and sync bytes are always 8/9 rate encoded in the current implementation. A minimum net efficiency improvement of approximately 5.0% should be realized even at small sector sizes with 16/17 rate coding.

SUMMARY OF THE INVENTION

Important objects of the present invention are to provide a data encoding method and apparatus for implementing a set rate code, including a 16/17 rate code for a data detection channel in a direct access storage device; to provide such method and apparatus substantially without negative effects; to provide a 16/17 rate code which meets critical error correcting code (ECC) constraints and that provides about a 5% file capacity increase over previous 8/9 rate codes; and to provide such method and apparatus that overcome many of the disadvantages of prior art arrangements.

In brief, a data encoding method and apparatus are provided for implementing a predefined rate code, such as a 16/17 rate code for a data detection channel in a direct access storage device. A binary data stream is received and sequential symbols of the received binary data stream are identified. Sequential alternate symbols of the binary data stream are encoded into first codewords. Sequential alternate other symbols are encoded into second codewords. The alternating first and second codewords are sequentially combined.

In accordance with a features of the invention, a rate 16/17 code includes alternate 9-bit codewords and 8-bit codewords. The 8-bit codewords are either raw symbols of the received binary data stream or remapped symbols for the received binary data stream. All likely error events are limited to within three consecutive bytes in a user data stream with a 16/17 rate code of the preferred embodiment.

BRIEF DESCRIPTION OF THE DRAWING

The present invention together with the above and other objects and advantages may best be understood from the following ailed description of the preferred embodiments of the invention illustrated in the drawings, wherein.

DETAILED DESCRIPTION OF THE PREFERRED EMBODIMENTS

Figure 1:
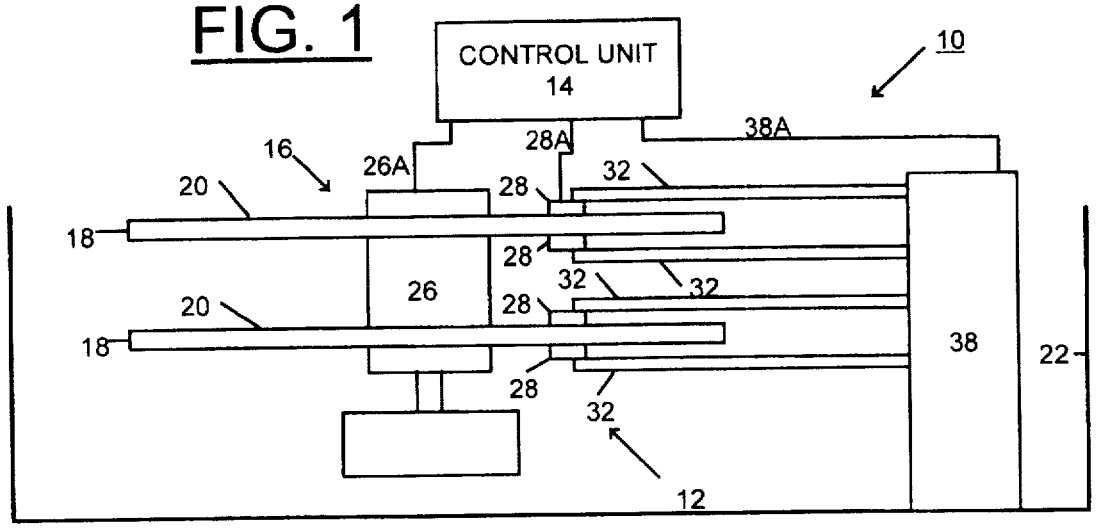
FIG. 1 is a schematic and block diagram of a data storage disk file embodying the present invention.
Figure 2:
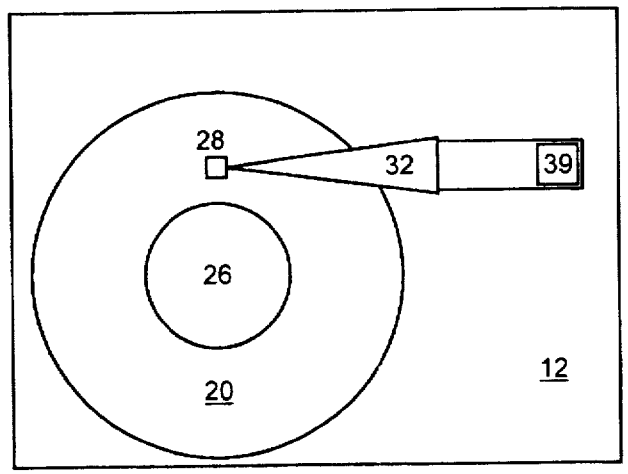
FIG. 2 is a schematic and block diagram showing the accessing mechanism for a single disk surface of the apparatus of FIG. 1.

Having reference now to the drawings, in FIGS. 1 and 2 there is illustrated a data storage disk file generally designated as 10 including a rigid magnetic disk drive unit 12 and an interface control unit generally designated as 14. Unit 12 is illustrated in simplified and diagrammatic form sufficient for an understanding of the present invention. The utility of the present invention is not restricted to the details of a particular drive unit construction. In accordance with the present invention, a rate 16/17 code includes even customer symbols in the data stream that are encoded using a standard rate 8/9 encoder. The odd customer symbols in the data stream are either written unencoded or remapped to corresponding predefined remapped symbols. The Read/

Reference Clock to the disk controller is properly modulated from the Read VCO in order to provide a correct customer byte or symbol clock.

The disk drive unit 12 includes a stack 16 of disks 18 each having at least one magnetic surface 20. The disks 18 are mounted parallel to one another within a housing 22 for simultaneous rotation on and by an integrated spindle and motor assembly 26. Information on each magnetic disk surface 20 is read from or written to the disk surface 20 by a corresponding transducer head assembly 28 movable in a path having a radial component across the rotating disk surface 20.

Each transducer head assembly 28 is carried by an arm 32. The arms 32 are ganged together for simultaneous pivotal movement by a head drive servo motor 38 including a voice coil 39 cooperating with an internal magnet and core assembly. Drive signals applied to the voice coil 39 cause the arms 32 to move in unison to position the transducer head assemblies 28 in registration with information storage tracks on the disk surfaces 20 where information is written or read.

The disk drive unit 12 is controlled in operation by signals provided by the control unit 14, including motor control signals on line 26A and head position control signals on line 38A. In a typical arrangement, control unit 14 provides an interface with a computer that provides data read and write commands, and data signals are transmitted to or from the transducer head assemblies over corresponding lines 28A, one of which is seen in FIG. 1. Servo position information is recorded on the disk surfaces 20, and the transducer head assemblies 28 read this servo information to provide a servo position signal to the control unit 14. This information is employed by the control unit 14 to provide position control signals on line 38A. The purpose of this position feedback system is to assure accurate and continuous positioning of the transducer head assemblies 28 so that data is written to and read from precise locations on the disk surfaces 20.

Figure 3:
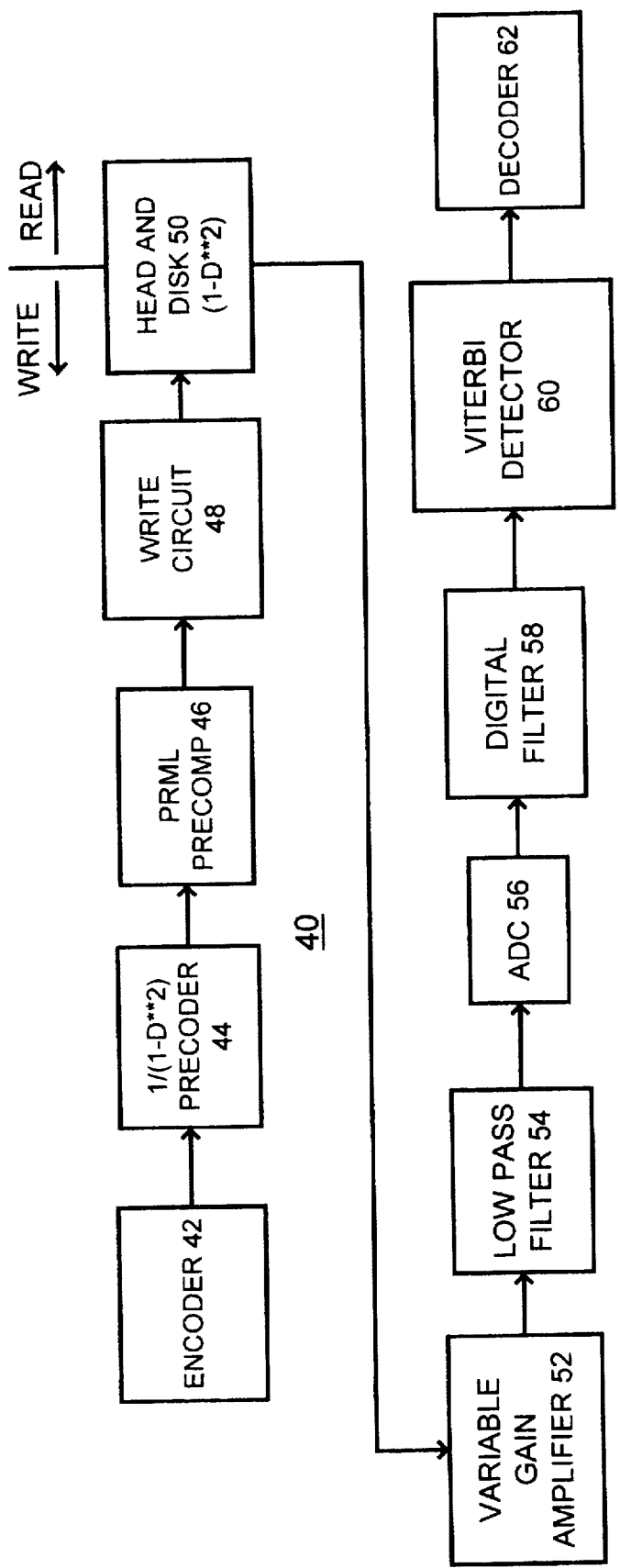
FIG. 3 is a block diagram of a data channel of the data storage disk file of FIG. 1 embodying the present invention.

Referring now to FIG. 3, there is shown a block diagram of a partial-response maximum-likelihood (PRML) channel 40 available in the disk file 10 including an encoder and decoder of the invention. Data to be written is applied to an encoder 42 of the invention for providing a modulation coded output having predefined run length constraints. A precoder 44 follows the encoder 42 described by a $1/(1-D^2)$ operation where D is a unit delay operator. A PRML precomp 46 coupled to the precoder 44 provides a modulated binary pulse signal applied to a write circuit 48 that provides the modulated write current for writing to the disk surface. An analog read signal is obtained at head and disk block 50 described by the $(1-D^2)$ operation. The read signal is applied to a variable gain amplifier (VGA) 52 of the preferred embodiment and the amplified read signal is applied to a lowpass filter 54. The filtered read signal is converted to digital form by an analog-to-digital converter (ADC) 56 that provides, for example, such as 64 possible 6-bit sampled values. The samples of the ADC 56 are applied to a digital filter 58, such as a 10 tap finite impulse response (FIR) digital filter. The filtered signal from the digital filter 58 is applied to a Viterbi detector 60 coupled to a decoder 62 of the invention to complete the maximum-likelihood (ML) detection process for data read back.

Figure 4:
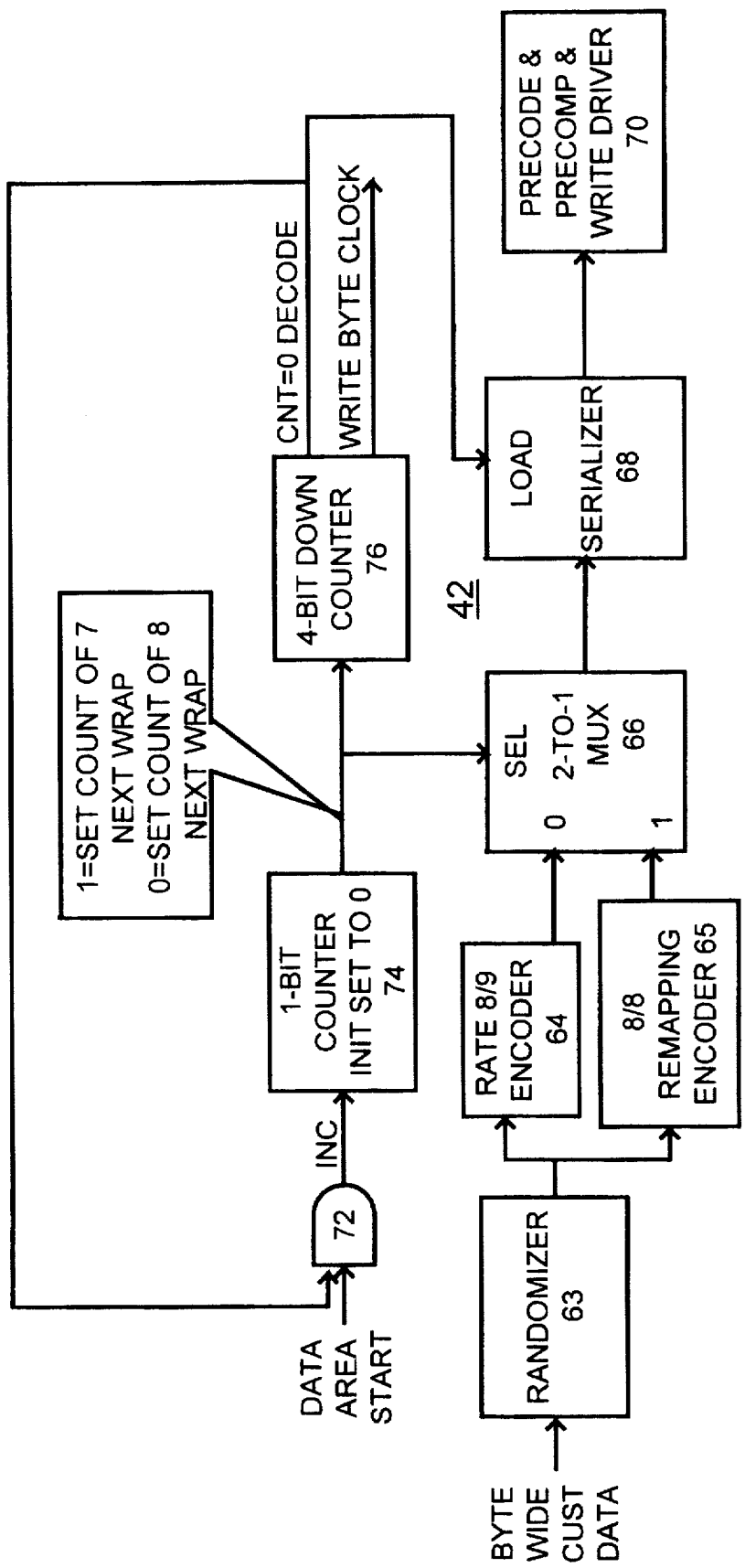
FIG. 4 is a block diagram of an encoder of the data channel of FIG. 3 of the present invention.

Referring now to FIG. 4, there is shown a block diagram functional representation of the encoder generally designated as 42 for carrying out a set rate code, such as a 16/17 rate code, of the invention. Byte wide customer data is applied to a randomizer 63 coupled to a rate 8/9 encoder 64 and a 8/8 remapping encoder 65. The remapping encoder 65 receives the customer data and provides an output of predetermined corresponding remapped symbols. It should be understood that the predetermined remapped symbols can include unchanged or raw customer data symbols or a different predefined symbol for each possible raw customer data symbol. The remapped symbol output of remapping encoder 65 is applied to an input of a 2-to-1 multiplexer (MUX) 66.

The encoded 8/9 data output of the rate 8/9 encoder 64 is applied to the other input of the 2-to-1 MUX 66. The multiplexer output is applied to a serializer 68 coupled to a precode, precomp and write driver 70.

A rate 8/9 encoder as described in U.S. Pat. No. 5,196,849 issued Mar. 23, 1993 to Richard L. Galbraith, advantageously is used for the rate 8/9 encoder 64. The subject matter of the above-identified U.S. Pat. No. 5,196,849 is incorporated herein by reference.

A multiplexer select SEL input and a LOAD input to the serializer 68 is generated with a AND gate 72, a 1-bit counter 74 initially set to 0 and a 4-bit counter 76. A DATA AREA START input and a CNT=0 DECODE output of 4-bit counter 76 are applied to the AND gate 72. The output of AND gate 72 at line labeled INC is applied to the 1-bit counter 74. The output of the 1-bit counter 74 initially set to 0, a 1 is set for a count of 7 and the next wrap, then a 0 is set for a count of 8 and the next wrap. The output of the 1-bit counter 74 is applied to the SEL input of multiplexer 66 and the 4-bit down counter 76. The 4-bit down counter 76 generates a write byte clock WRITE BYTE CLK and the CNT=0 DECODE.

Figure 5:
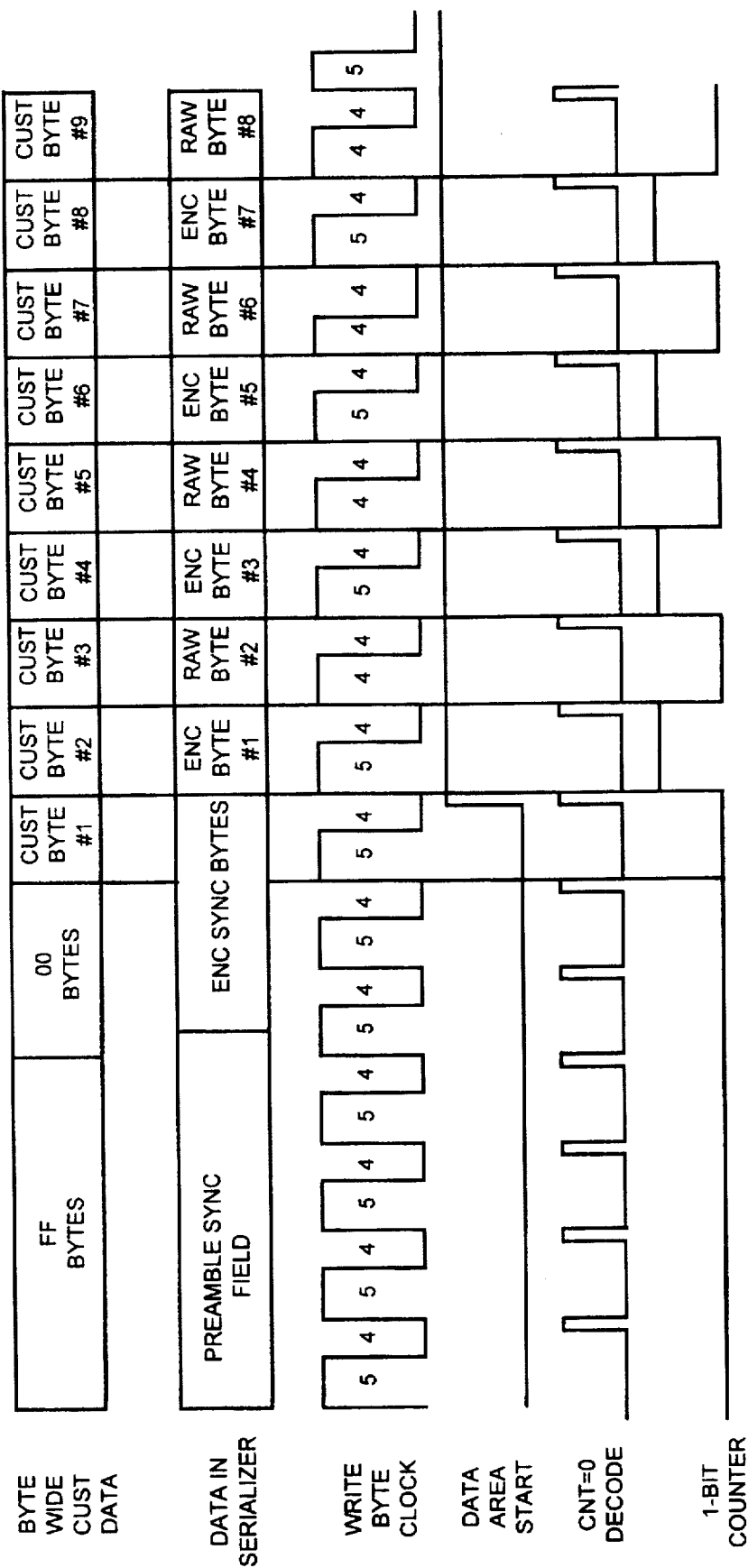
FIG. 5 is a diagram illustrating the operation of the encoder of FIG. 4.

Referring also to FIG. 5, byte wide customer data applied to the randomizer 62 is illustrated to include first FF bytes and 00 bytes, followed by customer data bytes #1–#9. Next data applied to the serializer 68 is illustrated to include a PREAMBLE SYNC FIELD and encoded sync bytes ENC SYNC BYTES, followed by encoded byte #1, raw byte #2, encoded byte #3, raw byte #4, encoded byte #5, raw byte #6, and encoded byte #7, raw byte #8. It should be understood that the illustrated raw bytes may include predetermined remapped symbols or unchanged customer data symbols. Write byte clock output of the 4-bit down counter 76 is illustrated to include a high and low clock for each customer data byte. Next the DATA AREA START input applied to the AND gate 72 is illustrated that remains low during the first FF bytes and 00 bytes and then remains high during the customer data bytes. The CNT=0 DECODE output of 4-bit counter 76 is illustrated that includes a positive pulse with each write byte clock low. Next the 1-bit counter output is illustrated that initially is low. The 1-bit counter output is low for odd numbered customer data bytes to select remapped or raw customer data symbols and is high for even numbered customer data bytes to select encoded customer data symbols from the rate 8/9 encoder 64.

Figure 6:
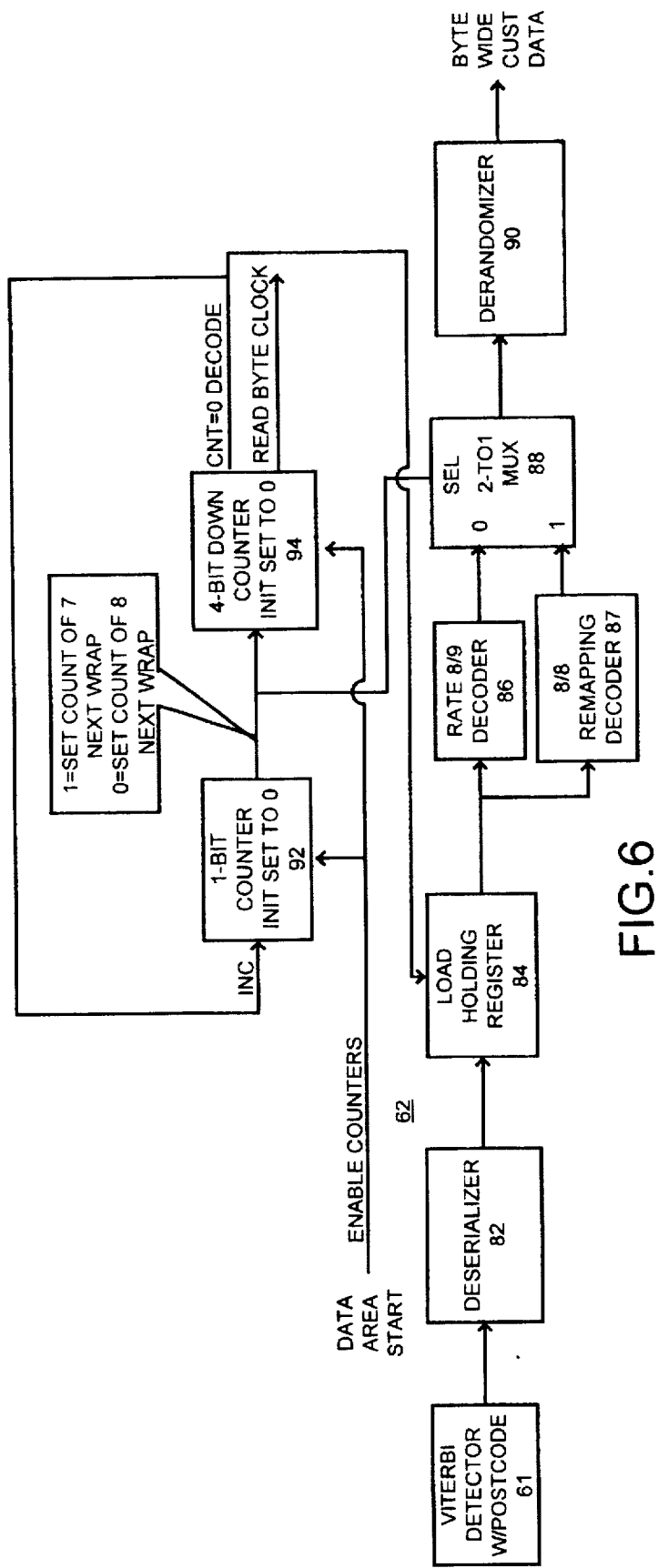
FIG. 6 is a block diagram of a decoder of the data channel of FIG. 3 of the present invention.

Referring now to FIG. 6, there is shown a block diagram functional representation of the decoder generally designated as 62 for carrying out a 16/17 rate code of the invention. The output of the Viterbi detector with postcode 61 is applied to a deserializer 82 coupled to a holding register 84. The output of the holding register 84 is applied to a rate 8/9 decoder 86 and a 8/8 remapping decoder 87. The decoded 8/8 data output of the 8/8 remapping decoder 87 is applied an input of a 2-to-1 multiplexer (MUX) 88. The decoded 8/9 data output of the rate 8/9 decoder 86 is applied to the other input of the 2-to-1 MUX 88. The multiplexer output is applied to a derandomizer 90. A multiplexer select SEL input and a LOAD input to the holding register 84 is generated with a 1-bit counter 92 initially set to 1 and a 4-bit down counter 94 initially set to 0. The 4-bit down counter 94 generates a read byte clock READ BYTE CLK and a CNT=0 DECODE which is applied to the 1-bit counter 92. The DATA AREA START input is applied to enable counters 92 and 94.

Figure 7:
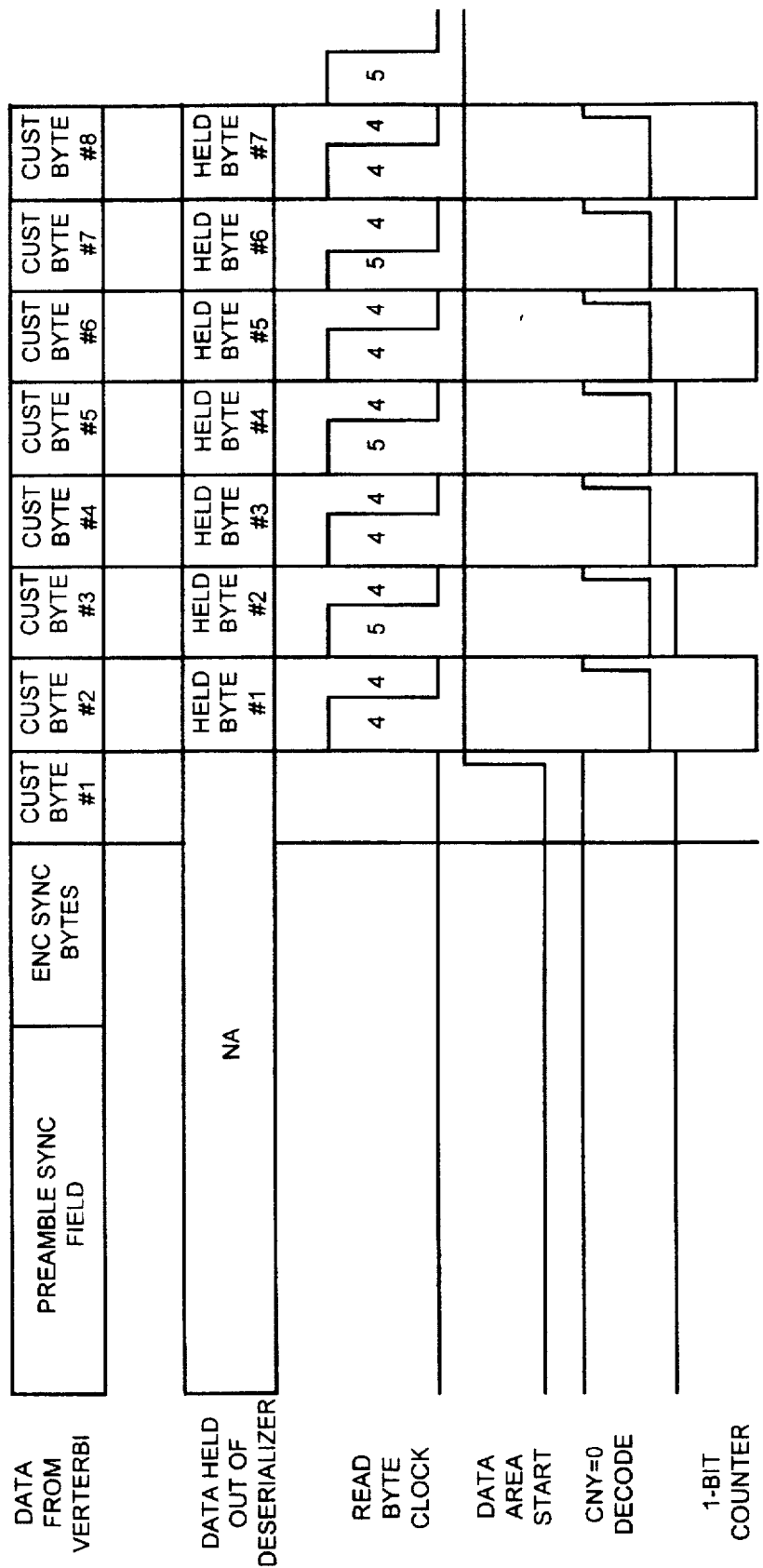
FIG. 7 is a diagram illustrating the operation of the decoder of FIG. 6.

Referring also to FIG. 7, data from the Viterbi detector 60 is illustrated to include a PREAMBLE SYNC FIELD and encoded sync bytes ENC SYNC BYTES, followed by encoded byte #1, raw byte #2, encoded byte #3, raw byte #4, encoded byte #5, raw byte #6, and encoded byte #7, raw byte #8. Next the data output of the deserializer 82 held by the holding register 84 is shown, followed by the read byte clock, and the DATA AREA START input. The CNT=0 DECODE output of 4-bit counter 96 is illustrated that includes a positive pulse with each read byte clock low. Next the 1-bit counter output is illustrated that initially is high. The 1-bit counter output is low for odd numbered customer data bytes to select raw customer data bytes and is high for even numbered customer data bytes to select decoded customer data bytes from the rate 8/9 decoder 86.

In summary, features of the set rate code of the invention include the following. For the 16/17 rate code, all likely error events will cause no more than three consecutive data bytes to be in error in the customer data stream. This allows conventional ECC to correct all likely error events using single burst correction, as is the case with the current 8/9 rate code. The invention requires only a very small increase in logic, for example, less than 1% logic area increase over a known 8/9 rate code implementation. The maximum ones rate 8/9 encode/decode logic advantageously is used to implement the 16/17 rate logic of the invention. The 16/17 rate implementation is completely transparent at the disk controller interface. No changes are required to the disk control unit 14 or any hardware outside of the channel 40. Rate 8/9 and rate 16/17 encoding are easily supported together. Selection of rate 8/9 or rate 16/17 data encoding is easily provided, such as through a programming interface. Multiple acquisition modes are supported for both rate 8/9 and rate 16/17 encoding modes, including redundant sync & 6-long byte sync. Sync fields and sync byte formatting and operation are identical for both rate 8/9 and rate 16/17 encoding modes.

While the present invention has been described with reference to the details of the embodiments of the invention shown in the drawing, these details are not intended to limit the scope of the invention as claimed in the appended claims.

What is claimed is:

1. A data encoding method for implementing a set rate code for a data detection channel in a direct access storage device, said data encoding method comprising the steps of:

receiving a binary data stream;

identifying sequential symbols of said received binary data stream;

utilizing a rate 8/9 encoder, encoding alternate symbols of said binary data stream into first 9-bit codewords;

utilizing an 8/8 remapping encoder, encoding alternate other symbols of said binary data stream into second 8-bit codewords; and sequentially combining alternate ones of said first 9-bit codewords and said second 8-bit codewords.

2. A data encoding method for implementing a set rate code as recited in claim 1 wherein the step of encoding alternate symbols of said binary data stream into first 9-bit codewords includes the step generating 9-bit codewords having maximum ones.

3. A data encoding method for implementing a set rate code as recited in claim 1 wherein the step of encoding sequential symbols of said binary data stream utilizing said 8/8 remapping encoder generates second 8-bit codewords identical to said alternate other symbols of said binary data stream.

4. A data encoding method for implementing a set rate code as recited in claim 1 wherein the step of encoding sequential symbols of said binary data stream utilizing said 8/8 remapping encoder generates second 8-bit codewords including predefined remapped codewords corresponding to each different one of said alternate other symbols of said binary data stream.

5. A data encoding method for implementing a set rate code as recited in claim 1 wherein the step of sequentially combining alternate ones of said first 9-bit codewords and said second 8-bit codewords includes the steps of providing a two input multiplexer; applying said first 9-bit codewords to a first input of said multiplexer; applying said second 8-bit codewords to a second input of said multiplexer; selecting said first 9-bit codewords for even symbols of said received binary data stream and selecting said second 8-bit codewords for odd symbols of said received binary data stream.

6. Apparatus for implementing a 16/17 rate code for a data detection channel in a direct access storage device comprising:

means for receiving a binary data stream;

means for identifying sequential symbols of said received binary data stream;

first encoding means for encoding alternate symbols of said binary data stream into 9-bit symbols;

second encoding means for encoding alternate other symbols of said binary data stream into 8-bit symbols;

means for sequentially combining said alternate encoded 9-bit symbols and 8-bit symbols to produce 17-bit codewords; and wherein said second encoding means for encoding alternate other symbols of said binary data stream include an 8/8 remapping encoder.

7. Apparatus for implementing a 16/17 rate code for a data detection channel as recited in claim 6 further includes means for receiving a readback data stream, first decoding means for decoding alternate encoded symbols of said readback data stream and second decoding means for decoding alternate other encoded symbols of said readback data stream.

8. Apparatus for implementing a 16/17 rate code for a data detection channel as recited in claim 7 further includes means for sequentially combining alternate decoded symbols of said received readback data stream.

9. Apparatus for implementing a 16/17 rate code for a data detection channel as recited in claim 8 wherein said means for sequentially combining alternate decoded symbols of said received readback data stream include a multiplexer having a first input coupled to said first decoding means and a second input coupled to said second decoding means.

10. Apparatus for implementing a 16/17 rate code for a data detection channel as recited in claim 6 wherein said first decoding means for decoding alternate encoded symbols of said readback data stream include a rate 8/9 decoder.

\* \* \* \* \*